(12) United States Patent
Lagares Corominas

(10) Patent No.: US 7,381,122 B2
(45) Date of Patent: Jun. 3, 2008

(54) STUFFING/DOSING MACHINE COMPRISING A TILTING HOPPER

(75) Inventor: Narcís Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 533 days.

(21) Appl. No.: 10/511,637

(22) PCT Filed: Apr. 17, 2002

(86) PCT No.: PCT/ES02/00188

§ 371 (c)(1),
(2), (4) Date: Jun. 29, 2005

(87) PCT Pub. No.: WO03/086086

PCT Pub. Date: Oct. 23, 2003

(65) Prior Publication Data

US 2006/0014483 A1    Jan. 19, 2006

(51) Int. Cl.
*A01K 11/00*    (2006.01)
(52) U.S. Cl. ...................................... 452/30
(58) Field of Classification Search ............... 141/80, 141/81, 114, 249, 258, 260, 270, 284; 452/21–23, 452/30–32, 35–37, 40–44
See application file for complete search history.

(56) References Cited

U.S. PATENT DOCUMENTS

| | | | | |
|---|---|---|---|---|
| 3,189,939 A | * | 6/1965 | Hughes | 452/35 |
| 3,733,653 A | * | 5/1973 | Javaloy et al. | 452/36 |
| 4,617,701 A | | 10/1986 | Frey | |
| 4,641,691 A | * | 2/1987 | Corominas | 141/73 |
| 4,672,793 A | * | 6/1987 | Terlizzi et al. | 53/434 |
| 4,723,581 A | * | 2/1988 | Staudenrausch et al. | 141/5 |
| 4,724,582 A | * | 2/1988 | Kunig et al. | 452/44 |
| 4,745,659 A | | 5/1988 | Abt et al. | |
| 4,953,262 A | | 9/1990 | Zinser | |
| 5,097,876 A | * | 3/1992 | Lagares | 141/249 |
| 5,352,150 A | * | 10/1994 | Markwardt | 452/30 |

FOREIGN PATENT DOCUMENTS

EP    0 897 668 A1    2/1999
WO    WO 97/30595 A1    8/1997

OTHER PUBLICATIONS

International Search Report for International Application No. PCT/ES 02/00188 mailed Aug. 23, 2002.

* cited by examiner

*Primary Examiner*—Thomas Price
(74) *Attorney, Agent, or Firm*—RatnerPrestia

(57) ABSTRACT

The invention relates to a stuffing/dosing machine comprising a tilting hopper. The machine comprises a hopper with a hermetic cover bearing a screw feeder and a narrowed base which communicates with an antechamber, said antechamber communicating in turn with at least one forming chamber which is connected to an outlet. Moreover, at least one actuated piston performs a stroke with one first section in the antechamber and a second section in the forming chamber. First and second structural units, which are formed respectively by the aforementioned hopper, cover, screw feeder and narrowed base and by said antechamber, forming chambers, pistons and actuation means, can be tilted independently between operating positions and cleaning and maintenance positions in relation to fixed frame comprising the valve and the outlet.

27 Claims, 5 Drawing Sheets

STUFFING/DOSING MACHINE COMPRISING A TILTING HOPPER

This application is a U.S. National Phase Application of PCT International Application PCT/ES02/00188 filed Apr. 17, 2002.

FIELD OF THE INVENTION

This invention relates to a stuffing/dosing machine comprising a tilting hopper, suitable for forming and optionally dosing flowable food materials, such as whole meat joints, meat cut into pieces or minced, meat masses, cheeses, fine pastas and jams, inter alia, and particularly meat cut into pieces or minced, which is compact and has high adherence properties, for example, meat masses for making mortadellas and salamis, and meat at a relatively low temperature, for example, between 0° C. and −5° C.

BACKGROUND TO THE INVENTION

Patent WO 99/29178, in the name of the current applicant, describes a stuffing/dosing machine of this type comprising a hopper like deposit containing a food material, that can be closed hermetically, wherein a vacuum has been created, and two stuffing cylinders, which operate alternatively, provided with corresponding pistons that perform a first section of their respective strokes directly within a narrowed area or antechamber in the lower part of the deposit in order to stir and push the food material as far as respective stuffing-dosing chambers placed at the base of said deposit and aligned coaxially with the cylinders, and a second section within said stuffing-dosing chambers to compact and introduce the food material into respective collector pipes connected to a rotary collector/distributor valve, the movement of which is synchronized with that of said stuffing cylinders to give way alternatively to the food material driven by one or other of the cylinders towards a common outlet duct. The speed and travel of the cylinder strokes and the movements of the valve are controlled by regulating means to provide a single continuous flow of food materials in said outlet conduit or, optionally, an interrupted flow of precisely dosed portions.

The said two stuffing cylinders are located outside the deposit, parallel to one another and in proximity, in a slightly inclined position and they are housed in an empty section of a side wall of the deposit, while their corresponding stems extend through the deposit wall to actuate in the antechamber and in the stuffing-dosing chambers located at the base of the deposit. In this way, the deposit, the antechamber, the cylinders, the pistons and the stuffing-dosing chambers form an ensemble or first structural unit, which is articulated at the base thereof with respect to the machine bed so that it can tilt, moving between a first position, or operative position, in which lower mouthpieces of the stuffing-dosing chambers are hermetically positioned in higher inlet mouthpieces of said alternative valve, and a second position, or cleaning and maintenance position, wherein said lower mouthpieces of the stuffing-dosing chambers are separated from said higher inlet mouthpieces of the alternative valve to a sufficient degree to enable easy access to both mouthpieces.

Patent U.S. Pat. No. 5,097,876, in the name of the current applicant, discloses a machine similar to that described above, but provided with a single cylinder having a single piston and dosing means associated with the outlet conduit.

Although these arrangements have proved to be satisfactory in practice, they can be improved, particularly when the material to be formed is, for example, meat cut into pieces or minced, that is compact and has high adherence properties, such as a meat mass for preparing mortadellas and salamis, and meat at a relatively low temperature, for example, between 0° C. and −5° C. In this case, the means for stirring and driving the material towards the inlet to the stuffing-dosing chambers, which consist of the pistons in the first section of their strokes, prove to be inefficient and the material tends to form gluts that prevent it from moving down inside the hopper.

An object of this invention is to provide one of said improvements concerning the accessibility to different parts of the machine, for example, to the piston heads, the stirring and driving means, stuffing-dosing chambers, valve, etc.

Another object of this invention is to provide another of said improvements concerning said means for stirring the food material contained in the deposit and driving it towards the antechamber where the first section of the stroke of the pistons is performed.

SUMMARY OF THE INVENTION

The above-mentioned objects are obtained, according to this invention, by providing a stuffing/dosing machine comprising a tilting hopper, having a general structure that is very similar to that described in said patent WO 99/29178, that is, a hopper that receives the material to be stuffed/dosed, provided with a top opening having an hermetic cover and a narrowed base associated with an antechamber that leads to the inlets to two stuffing-dosing chambers, which are parallel to one another and connected, by means of an alternative valve, to a common outlet duct, and two pistons driven independently by driving means to perform respective strokes covering a first section in said antechamber and a second section in one of the said two stuffing-dosing chambers.

One improvement consists essentially in making one ensemble or first structural unit, comprising the hopper, its cover and its narrowed base, structurally independent from another ensemble or second structural unit comprising the antechamber, the two stuffing-dosing chambers, the said two pistons and their driving means, leaving the valve, its inlet and common outlet ducts integrated in a fixed machine frame. Each of the two ensembles or structural units can be tilted independently to provide access to the different parts of the machine.

The said ensemble that includes the hopper, its cover and its narrowed base, is articulated with respect to a frame, said articulation enabling it to pivot between a first position, or operative position, in which a bottom mouthpiece of the narrowed base of the hopper is positioned in a top mouthpiece of the antechamber, and a second position, or cleaning and maintenance position, in which said bottom mouthpiece of the narrowed base of the hopper is separated from said top mouthpiece of the antechamber leaving enough space to enable easy access to both mouthpieces. By means of the bottom mouthpiece of the narrowed base of the hopper, access is gained to the inside of the lower area of the hopper, while by means of the top mouthpiece of the antechamber, access is gained to the inside of said antechamber, the piston heads and the top mouthpieces of the stuffing-dosing chambers.

The other ensemble, which includes the antechamber, the two stuffing-dosing chambers, the said two pistons and their driving means is, in turn, articulated with respect to the frame, with it being able to pivot between a first position, or operative position, in which bottom mouthpieces of the stuffing chamber are hermetically positioned in top inlet mouthpieces of said alternative valve, and a second position, or cleaning and maintenance position, in which said bottom mouthpieces of the stuffing-dosing chambers are separated from said top inlet mouthpieces of the alternative valve, leaving enough space to enable easy access to both mouthpieces. Through the bottom mouthpieces of the stuffing-dosing chambers access is gained to the inside of said chambers and through the top inlet mouthpieces of the valve, access is gained to the conduits and mobile parts of the valve.

Each of these structural ensembles includes driving means to enable it to pivot between its respective first and second positions. Since the second structural ensemble, in its operative status, remains trapped between the first ensemble and the frame, in order that said second ensemble can be tilted, the first ensemble must be tilted first.

Another improvement consists essentially in making said means for stirring said material to be stuffed/dosed, contained in said hopper, and driving it towards said antechamber of the stuffing pistons, independent. To this end, the machine according to this invention comprises a traditional screw feeder, or spiral, mounted on a shaft supported inside the cover and driven through the cover by driving means attached to the outside thereof. The shape of said screw feeder is adapted to a substantially conical part of the hopper, adjacent to the narrowed base thereof, so that an outer edge of the blade is next to the wall of said substantially conical part when the cover is closed. The cover can articulate with respect to the hopper, leaving the axis of said articulation in a substantially vertical position when the said ensemble containing the hopper, the cover and narrowed base is in the second position or cleaning and maintenance position. When the cover is open, the first ensemble being in this position, the screw feeder is exposed to be cleaned or maintained, while access is provided to the inside of the hopper.

This arrangement provides means that are fully capable of stirring and driving the material inside the hopper, even when said material is meat cut into pieces or minced, which is compact and has high adherence properties, for example, a meat mass for preparing mortadellas and salami, and meat at a relatively low temperature, for example, between 0° C. and −5° C. Furthermore, access is improved to the various machine parts that, when in use, are in contact with the material to be formed, including the new means for stirring and driving said material.

In the preceding summary, referenced has been made to a machine having a double stuffing chamber with double piston because it is an example of a preferred embodiment, although the invention would be equally applicable to a machine comprising one stuffing chamber and one single piston.

BRIEF DESCRIPTION OF THE DRAWINGS

These and other features and advantages will be more clearly understood from the following detailed description of an embodiment, with reference to the attached drawings, in which.

DETAILED DESCRIPTION OF AN EMBODIMENT OF THE INVENTION

Figure 1:
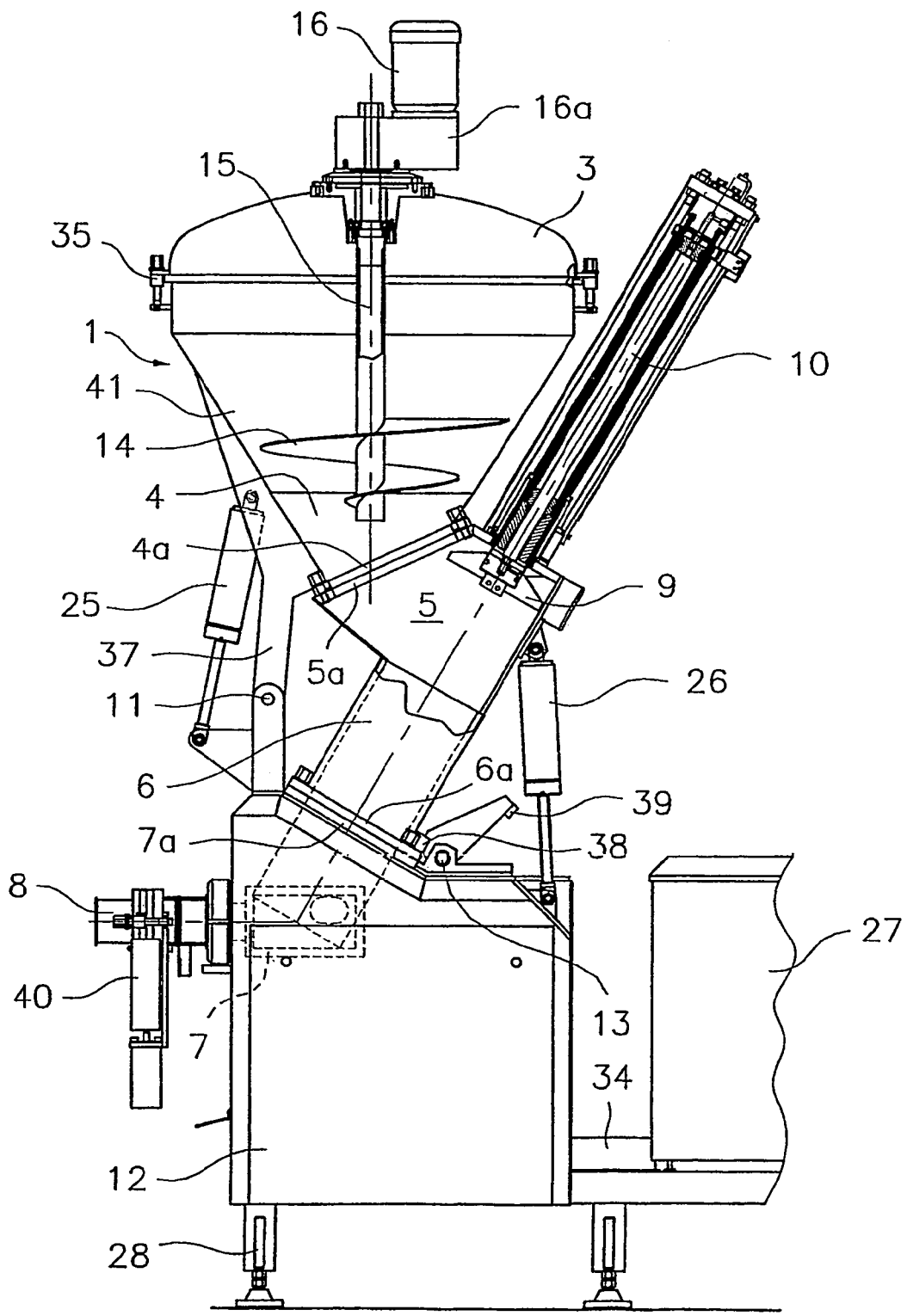
FIG. 1 is a partial diagrammatic side elevation view, partially in section, of the stuffing/dosing machine comprising a tilting hopper according to this invention with its ensembles in the first position, or operative position.
Figure 2:
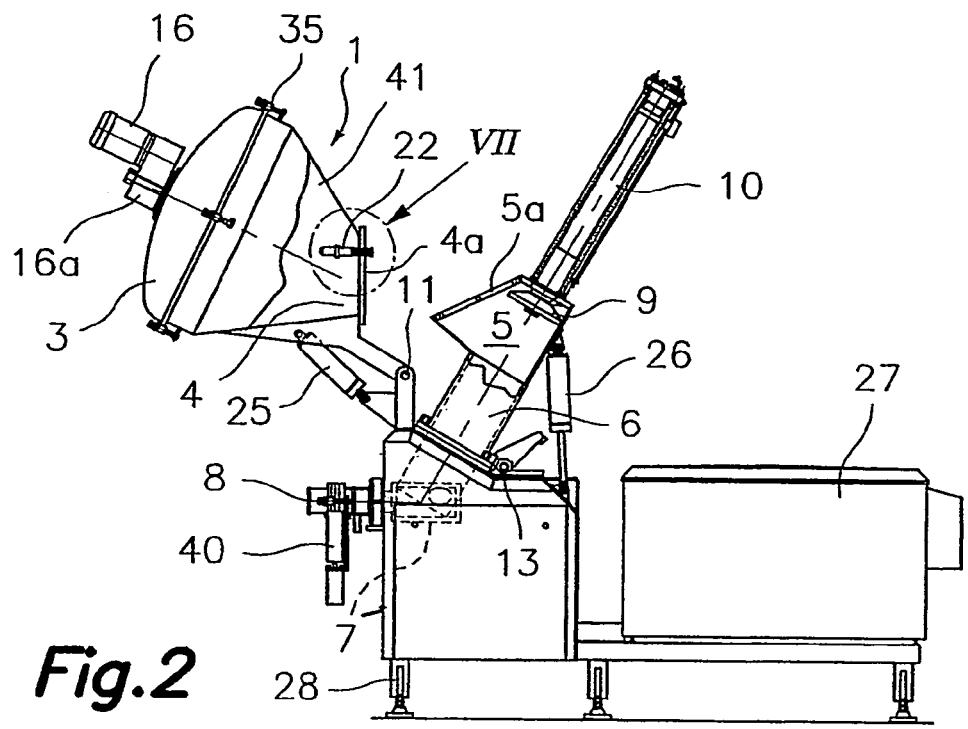
FIG. 2 is a diagrammatic side elevation view, partially in section, of the machine in FIG. 1, with a first ensemble tilted in the second position, or cleaning and maintenance position, and a second ensemble in the first position, or operative position.
Figure 3:
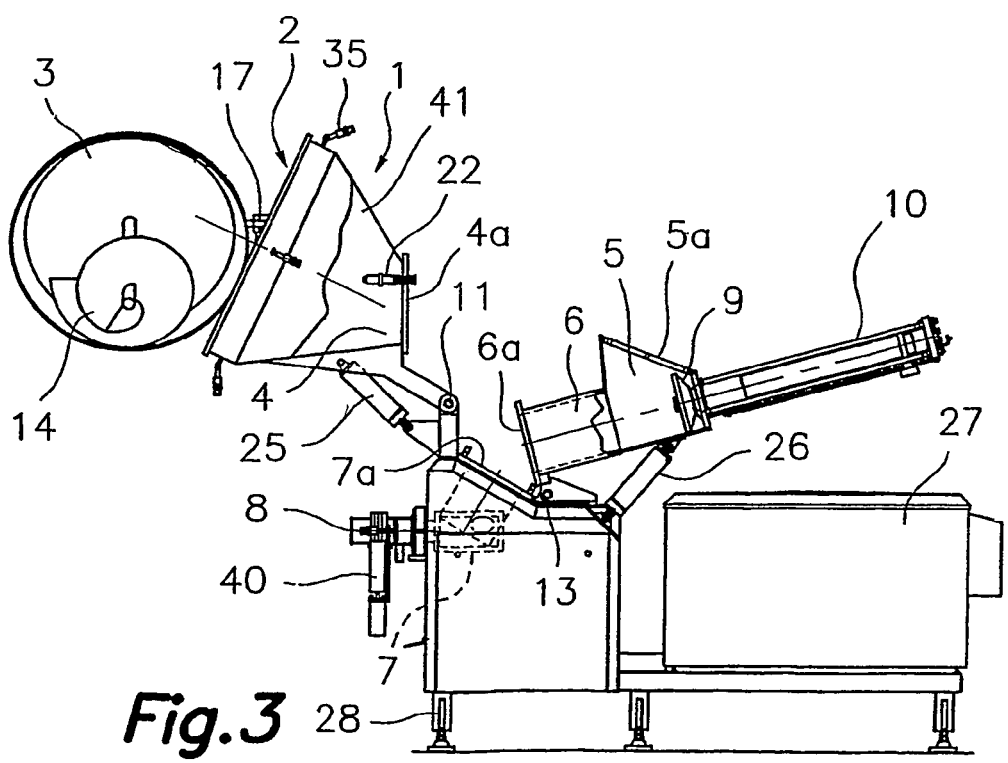
FIG. 3 is a diagrammatic side elevation view, partially in section, of the machine in FIG. 1, with both ensembles in the second position, or cleaning and maintenance position.

With reference, first of all, to FIGS. 1 to 6, they illustrate the stuffing/dosing machine comprising the tilting hopper of this invention, which includes a tilting hopper 1, that receives the material to be stuffed/dosed, with the tilting hopper 1 being provided with a top opening 2 having a hermetic cover 3 and a narrowed base 4 associated with an antechamber 5 that leads to the inlet to two stuffing-dosing chambers 6, that are parallel to one another and connected, via an alternative valve 7, to a common outlet duct 8. In order to drive and form the material, two pistons 9 are included, which are driven independently by driving means 10, which perform respective strokes covering a first section of said antechamber 5 and a second section in a corresponding chamber 6 of said two stuffing-dosing chambers 6. To this end, the said driving means 10, which in the illustrated example consist of two fluid dynamic cylinders that are parallel to one another (FIG. 6), are located outside the hopper, approximately following the same tilt as the wall of a substantially conical part 41 of the hopper 1, and they are attached to the top part of the antechamber 5. The stems of said fluid dynamic cylinders 10 extend inside the antechamber 5 through some holes that are hermetically sealed in an appropriate fashion, and at the ends thereof they hold the said pistons 9. The two stuffing-dosing chambers 6 are coaxially aligned with the cylinders 10 and their inside diameter is adapted to the outside diameter of the pistons 9 to that the former can slide fittingly inside the former.

The hopper 1, its cover 3, and its narrowed base 4 are grouped structurally in a first ensemble or structural unit that includes an articulation 11 with respect to a fixed base 12, which is supported on the floor by means of feet 28. This first ensemble can pivot around said articulation 11 between a first position, or operative position (FIGS. 1 and 4), in which a bottom mouthpiece 4a of the narrowed base 4 of the hopper 1 is positioned in a top mouthpiece 5a of the antechamber 5, and a second position, or cleaning and maintenance position (FIGS. 2, 3, 5 and 6), in which said bottom mouthpiece 4a of the narrowed base 4 of the hopper 1 is separated from said top mouthpiece 5a of the antechamber 5 to a sufficient degree to enable easy access to both mouthpieces 4a, 5a. Said articulation 11 connects a raised point of frame 12, which constitutes a fixed body of the machine, to a point of a support 37 attached to said first tilting structural unit and located at a level below the mouthpiece 4a. This enables the first structural unit to describe a relatively large arch when it is tilted, so as to separate the mouthpiece 4a from the mouthpiece 5a.

On the other hand, a second ensemble or second structural unit that comprises the antechamber 5, the two stuffing-dosing chambers 6, the said two pistons 9 and their driving means 10 includes an articulation 13 with respect to said frame 12, in which said valve 7 and the common outlet duct 8 are mounted. This second ensemble can pivot around said articulation 13 between a first position, or operative position (FIGS. 1, 2, 4 and 6), in which bottom mouthpieces 6a of the stuffing-dosing chambers 6 are hermetically positioned in top inlet mouthpieces 7a of said alternative valve 7, and a second position, or cleaning and maintenance position (FIG. 3), in which said bottom mouthpieces 6a of the stuffing-dosing chambers 6 are separate from said top inlet mouthpieces 7a of the alternative valve 7 to a sufficient degree to enable easy access to both mouthpieces 6a, 7a. Said articulation 13 connects a raised point of frame 12, next to the top inlet mouthpieces 7a of the alternative valve 7, to a point of a support 38 attached to said second structural unit and located near to the mouthpiece 6a. Said support 38 includes an appendix 39 that acts as a tilting limit end stop for the second structural ensemble.

The hermetic seat between the mouthpieces 4a and 5a, as well as between the mouthpieces 6a and 7a, is obtained by respective strips placed around the mouthpieces and which, in their respective operative positions, back onto one another, trapping an elastic sealing gasket.

Figure 7:
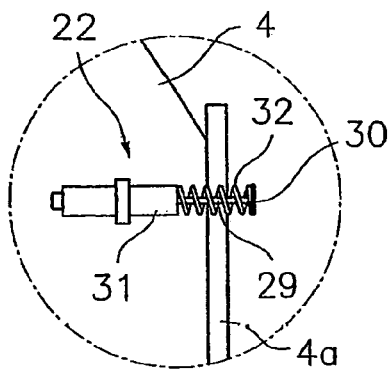
FIG. 7 is a view of the detail VII-VII in FIG. 2, enlarged.

Elastic end stops 22 are arranged around the bottom mouthpiece 4a of the narrowed base 4 of the hopper 1, to enter into contact with some surfaces adjacent to the top mouthpiece 5a of the antechamber 5, and consequently, cushion the seat closure between both mouthpieces 4a, 5a. FIG. 7 shows an enlarged detail of one of said elastic end stops 22, which comprises a captive pin 29 that ends in a contact end stop 30 and can slide in a support 31 against the strength of elastic means, such as a spring 32.

In order that said first ensemble, made up of the hopper, the cover and the narrowed base 1, 2, 3, pivots between said first and second positions, some driving means 25 are provided which, in the illustrated example, consist of a fluid dynamic cylinder. Similarly, in order that said second ensemble, made up of the antechamber, the stuffing-dosing chambers, the pistons and their driving means 5, 6, 9, 10, to pivot between said first and second positions, some driving means 26 are provided, consisting of another fluid dynamic cylinder. The frame 12 includes a cabinet 27 which houses some fluid dynamic energy supply devices for the driving means 10, 25 and 26 and some electronic control means that control said driving means. A bundle of conduits 34 communicates said cabinet 27 with the frame 12 of the machine, in which a control panel 33 provides an operator with useful controls and indicators for operating the machine.

In the stuffing/dosing machine of this invention, the said means for stirring and driving the material to be stuffed/dosed, which is in said hopper 1, towards the said antechamber 5, are associated with the cover 3, and consequently they are different from the pistons 9 and independent thereof. These means comprise, in the inside part of the cover 3, a screw feeder or spiral 14 mounted on a shaft 15 supported in a rotary manner on the cover 3. The said shaft 15 extends through the cover 3 via an opening that is sealed hermetically in an appropriate fashion, and it is driven by driving means 16 attached to the outside part of the cover 3. The driving means can comprise, for example, an electric or hydraulic motor 16 coupled to a reducer 16a. The shape of the said screw feeder 14 is adapted to said substantially conical portion 41 of the hopper 1, so that an outer edge of the screw feeder 14 remains near the wall of said substantially conical part 41 when the cover 3 is closed. When the cover 3 is open, both the screw feeder 14 and the top part of the hopper 1 are comfortably accessible. The cover 3 includes an articulation 17 with respect to the hopper 1, made up of a hinge presenting a certain tilted angle with respect to the plane of the top opening 2 of the hopper 1, as can be seen clearly in FIG. 9. By virtue of this arrangement, when the said ensemble consisting of the hopper, the cover and the narrowed base 1, 2, 3, is in the second position or cleaning and maintenance position, the axis of said articulation 17 remains in a substantially vertical position (see the enlarged detail in FIG. 5) although the cover 3 proper and the screw feeder 14 remain in a tilted position. This means that the cover 3 can be opened and closed with gentle, steady movements, manually and without any effort.

Figure 9:
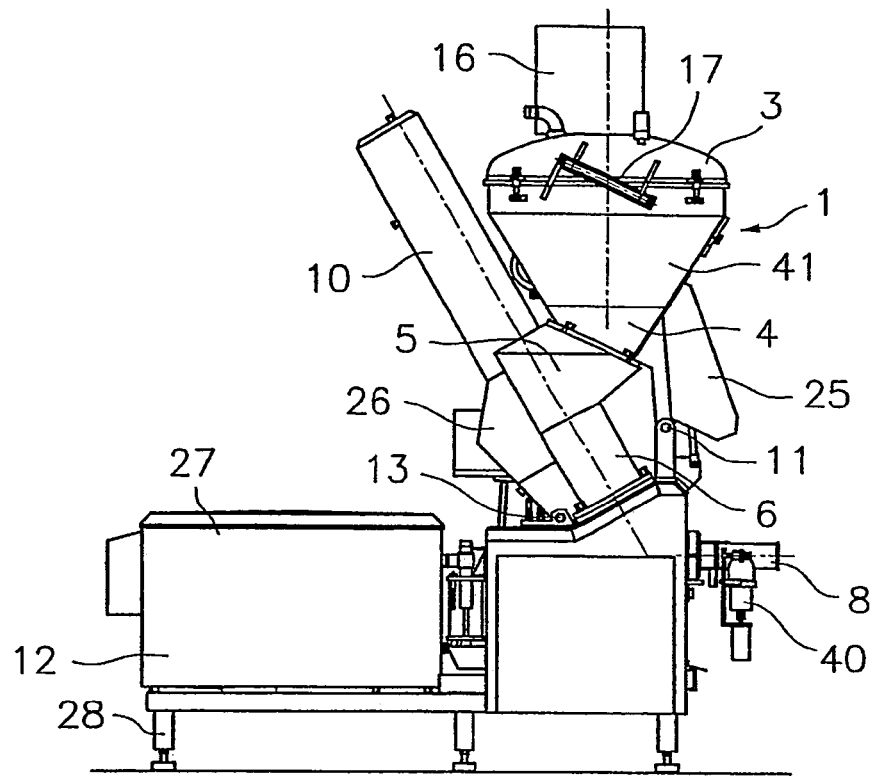
FIG. 9 is a side elevation view, taken from the side opposite to that in FIG. 1, in operative arrangement and with corresponding cowls protecting the various driving means.

Said FIG. 9 also illustrates cowls that cover the driving means 10, 16, 25 and 26, both in order to protect said means and the operators. The cowls of driving means 25 and 26 have articulated and sliding parts that enable the first and second structural units to be tilted, respectively.

Figure 4:
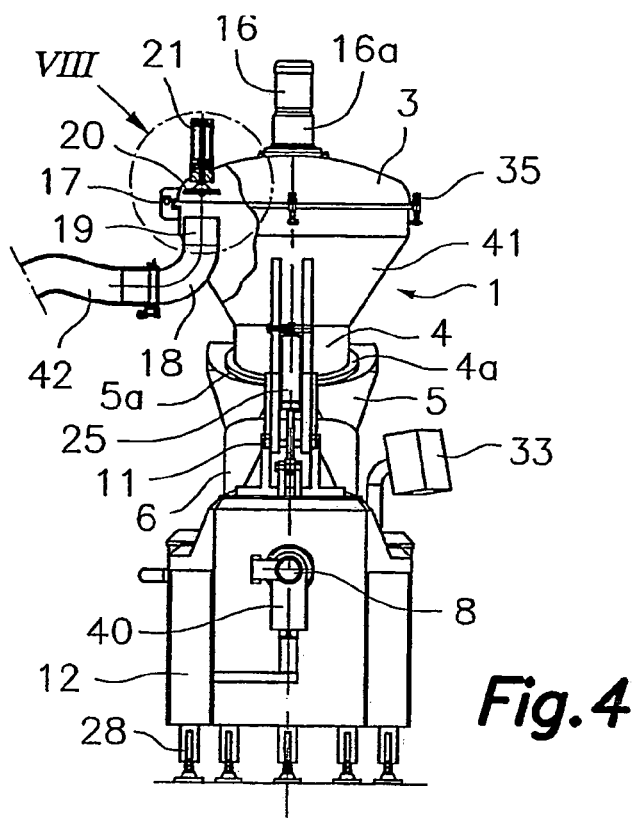
FIG. 4 is a front elevation view, partially in section, of the machine in FIG. 1, with both ensembles in the first position, or operative position, showing an arrangement for the input of material to be stuffed/dosed.
Figure 5:
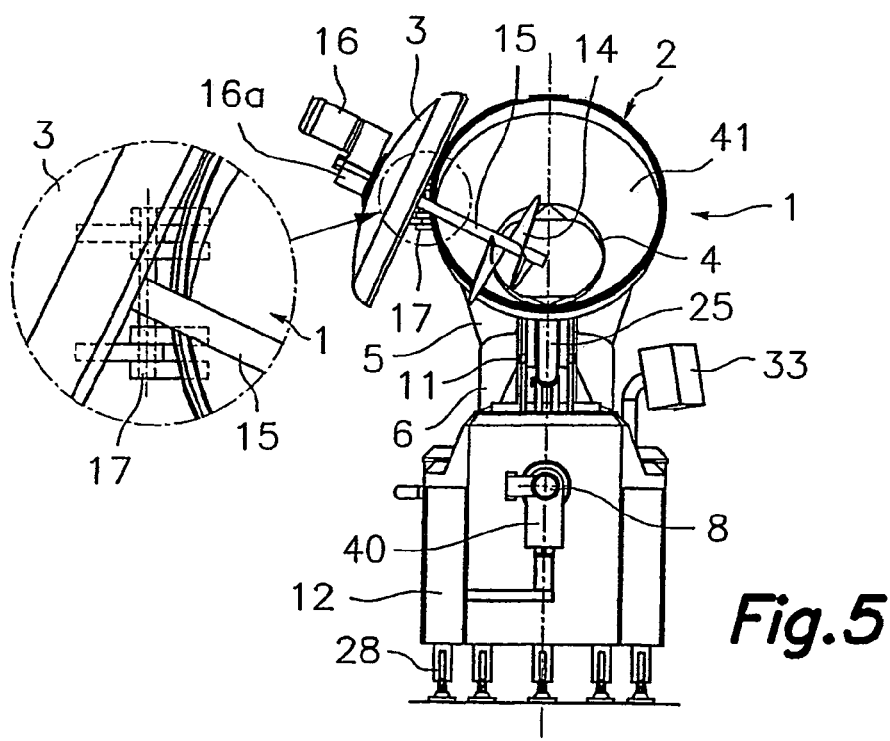
FIG. 5 is a front elevation view of the machine in FIG. 1, with both ensembles tilted in the second position, or cleaning and maintenance position, and with an enlarged detail showing the vertical position of the cover hinge in this situation.
Figure 6:
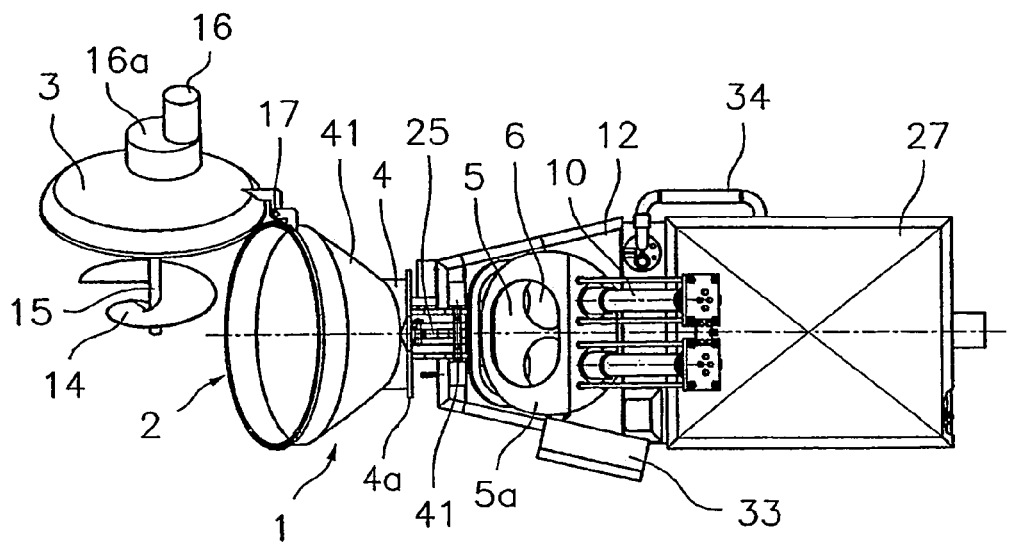
FIG. 6 is a plan view of the machine in FIG. 1, with the first ensemble tilted in the second position, or cleaning and maintenance position, and the second ensemble in the first position, or operative position.
Figure 8:
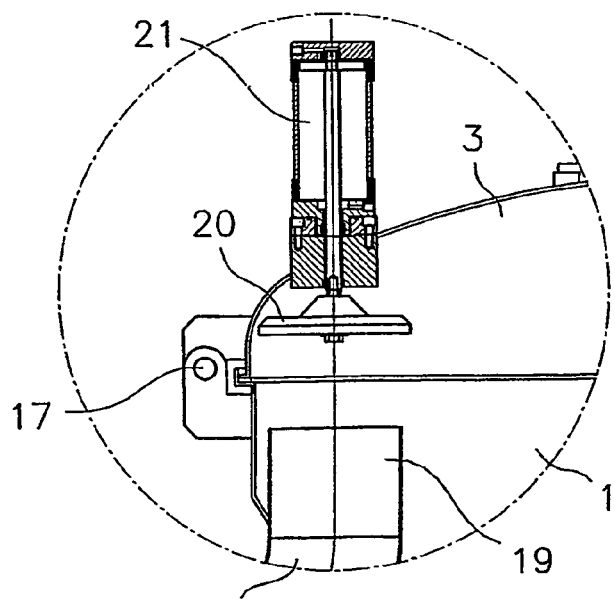
FIG. 8 is a view of the detail VIII-VIII in FIG. 4, enlarged.

FIG. 4 shows an inlet 18 of material to be stuffed/dosed through a side wall of the hopper 1, with said inlet being connected on the outside to a supply source of material to be vacuum formed/dosed by means of a flexible conduit 42. Said inlet 18 comprises a duct that forms, inside the hopper 1, an outlet mouthpiece 19 opposite a seal 20 mounted on a stem that is supported on the inside part of the cover 3 and driven through the cover 3 via driving means 21 that are attached to the outside thereof, as can be seen more clearly in the enlarged detail of FIG. 8. In the operative position and when the cover 3 is closed hermetically by an elastic seal pressed between the cover and the hopper by clamps 35, a depression is created inside the hopper by means of a connection (not shown) to a vacuum source, and by virtue of said depression, the material to be formed is sucked from a supply source thereof (not shown) to inside the hopper 1 via the inlet 18, which can be sealed optionally, by operating the seal 20 as is known.

The said electronic control means control, inter alia, the driving means 10 of the pistons 9 so that the latter perform their strokes alternately. For its part, said alternative valve 7 is connected to driving means, which are also controlled by said electronic control means so that they communicate alternately the outlet of each stuffing chamber 6 to said common outlet duct 8 in a way that is synchronized with the driving of the pistons 9. Said electronic control means are capable of controlling the speed and movement of the strokes of the pistons 9 in combination with the positions of the valve 7 to provide a continuous flow of material through the common outlet duct 8 or to perform short discrete stops between partials strokes, complete strokes or groups of strokes in order to provide an interrupted flow of dosed portions of material through the common outlet duct 8. A blade mechanism 40 arranged in the outlet duct 8 ensures a complete division between the portions. The electronic control means are also capable of controlling the level of material to be stuffed/dosed that is present inside the hopper 1, by controlling the said seal 20 in response to a signal obtained from detection means (not shown) installed inside the hopper 1.

Figure 10:
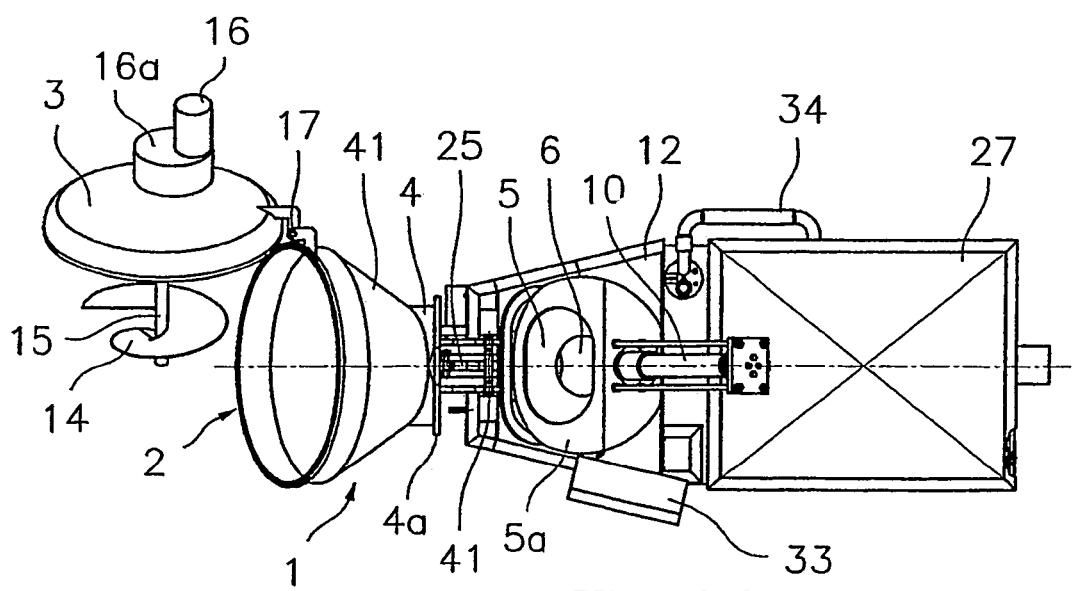
FIG. 10 is a plan view of a variant of the machine of this invention, comprising a single piston associated with a single stuffing chamber, with the first ensemble being in the second position, or cleaning and maintenance position, and the second ensemble being in the first position, or operative position.

FIG. 10 shows another embodiment of the stuffing/dosing machine of this invention, which is very similar to the embodiment shown in FIGS. 1 to 9, except that it has a single stuffing chamber 6 with a single piston driven by one fluid dynamic cylinder 10. A connection ensemble is arranged between the outlet of the stuffing chamber 6 and the outlet duct, which can be a direct connection or can include dosing means such as those described in patent U.S. Pat. No. 5,097,876, mentioned above.

A person skilled in the art will easily think of variations with respect to the embodiment described, without departing from the scope of this invention, as defined in the attached claims.

The invention claimed is:

1. A stuffing/dosing machine having a tilting hopper, the machine comprising:
   a tilting hopper, that receives the material to be stuffed/dosed, provided with a top opening having a hermetic cover and a narrowed base associated with an antechamber that leads to the inlet of at least one stuffing chamber connected to an outlet duct via a connection ensemble;
   at least one piston driven by driving means to perform a stroke covering a first section in said antechamber and a second section in said stuffing chamber, of which there is at least one;
   means for stirring said material to be stuffed/dosed that is in said hopper and drive it towards the said; and
   an ensemble comprising the hopper, the hermetic cover, and the narrowed base forming a first structural unit that can pivot around an articulation between a first position, or operative position, in which a bottom mouthpiece of the narrowed base of the hopper is hermetically positioned in a top mouthpiece of the antechamber, and a second position, or cleaning and maintenance position, in which said bottom mouthpiece of the narrowed base of the hopper is separated from said top mouthpiece of the antechamber to a sufficient degree to enable easy access to both mouthpieces.

2. The machine, according to claim 1, wherein another ensemble comprising the antechamber, the stuffing chamber, the said piston and its driving means forms a second structural unit that can pivot around an articulation between a first position, or operative position, in which a bottom mouthpiece of the stuffing chamber is hermetically positioned in a top mouthpiece of said connection ensemble to the outlet duct, and a second position, or cleaning and maintenance position, in which said bottom mouthpiece of the stuffing chamber is separated from said top mouthpiece of the connection ensemble to the outlet duct in a sufficient degree to enable easy access to both mouthpieces.

3. The machine, according to claim 1, wherein the machine-comprises two of said stuffing-dosing chambers, that are parallel to one another, with their inlets in said antechamber and with their outlets connected to respective inlets of an alternative valve coupled to said outlet duct, which is common to both stuffing-dosing chambers, with two of said pistons being arranged parallel to one another, and driven independently by said driving means to perform respective strokes covering a first section in said antechamber and a second section in one of the corresponding stuffing-dosing chambers.

4. The machine, according to claim 3, wherein another ensemble comprising the antechamber, the two stuffing-dosing chambers, the said two pistons and their driving means forms a second structural unit that can pivot around an articulation between a first position, or operative position, in which bottom mouthpieces of the stuffing-dosing chambers are hermetically positioned in top inlet mouthpieces of said alternative valve, and a second position, or cleaning and maintenance position, in which said bottom mouthpieces of the stuffing-dosing chambers are separated from said top inlet mouthpieces of the alternative valve to a sufficient degree to enable easy access to both mouthpieces.

5. The machine, according to claim 4, wherein said top inlet mouthpieces of the alternative valve, the valve proper and the common outlet duct are integrated in a frame, which forms a fixed body of the machine.

6. The machine, according to claim 5, wherein said articulation connects a raised point of said frame, near the top inlet mouthpieces of the alternative valve, to a point of a support attached to said second structural unit and located near the mouthpiece.

7. The machine, according to claim 4, further comprising elastic end stops arranged around the bottom mouthpiece of the narrowed base of the hopper to abut against surfaces adjacent to the top mouthpiece of the antechamber and consequently cushion the seat between both mouthpieces.

8. The machine, according to claim 7, wherein each of said elastic end stops comprises a captive pin that can slide against the strength of elastic means and ends in a contact end stop.

9. The machine, according to claim 4, further comprising driving means for making said second structural unit or ensemble containing the antechamber, the stuffing-dosing chambers, pistons and their driving means pivot between said first and second positions.

10. The machine, according to claim 9, wherein said driving means comprises at lease one fluid dynamic cylinder.

11. The machine, according to claim 4, further comprising electronic control means that control the driving means of the pistons so that the latter perform their strokes in an alternate manner, and said alternative valve is connected to driving means that are also controlled by said electronic control means to alternatively connect the outlet of each stuffing chamber to said common outlet duct in a way that is synchronized with the driving of the pistons.

12. The machine, according to claim 11, wherein said electronic control means are capable of controlling the speed and the movement of the strokes of the pistons to provide a continuous flow of material through the common outlet duct or to perform short discrete stops between partial strokes, complete strokes or groups of strokes in order to provide an interrupted flow of dosed portions of material through the common outlet duct.

13. The machine, according to claim 4, wherein said hermetic seat between the mouthpieces is obtained by respective strips placed around the mouthpieces and which, in their corresponding operative positions, back onto one another, trapping an elastic sealing gasket.

14. The machine, according to claim 3, wherein said means for stirring and driving the material to be stuffed/ dosed, which is contained in said hopper, towards said antechamber are associated with said cover.

15. The machine, according to claim 14, wherein the means for stirring and driving the material to be stuffed/dosed comprises a screw feeder or spiral mounted on a shaft supported on the inside of the cover, said shaft extending through the cover via an opening that is sealed hermetically in an appropriate fashion and being driven by driving means attached to the outside part of the cove.

16. The machine, according to claim 15, wherein the hopper has a substantially conical part adjacent to the narrowed base and the shape of said screw feeder is adapted so that an outer edge thereof remains near the wall of said substantially conical part when the cover is closed.

17. The machine, according to claim 15, wherein said driving means comprises an electric or fluid dynamic motor connected to the shaft by means of a reducer transmission.

18. The machine, according to claim 15, wherein the cover is connected to the hopper by means of an articulation, leaving the axis of said articulation in a substantially vertical position when the first structural unit, or ensemble containing the hopper, cover and narrowed base is in the second position or cleaning and maintenance position.

19. The machine, according to claim 3, wherein said articulation connects a raised point of said frame, which forms a fixed body of the machine, to a point of a support attached to said first structural unit and located at a level below the mouthpiece.

20. The machine, according to claim 1, wherein said articulation connects a raised point of said frame, which forms a fixed body of the machine, to a point of a support attached to said first structural unit and located at a level below the mouthpiece.

21. The machine, according to claim 1, wherein said hermetic seat between the mouthpieces is obtained by respective strips placed around the mouthpieces and which, in their corresponding operative positions, back onto one another, trapping an elastic sealing gasket.

22. The machine, according to claim 1, further comprising driving means for making said first structural unit or ensemble containing the hopper, cover and narrowed bottom pivot between said first and second positions.

23. The machine, according to claim 22, wherein said driving means (10, 25, 26) comprises at least one fluid dynamic cylinder.

24. The machine, according to claim 1, wherein said means for stirring and driving the material to be stuffed/dosed, which is contained in said hopper, towards said antechamber are associated with said cover and comprise a screw feeder or spiral mounted on a shaft supported on the inside of the cover, said shaft extending through the cover via an opening that is sealed hermetically in an appropriate fashion and being driven by driving means attached to the outside part of the cover.

25. The machine, according to claim 1, wherein said hopper comprises an inlet of material to be stuffed/dosed through a side wall of the hopper, with said inlet being connected on the outside to a supply source of material to be vacuum formed/dosed by means of a flexible conduit.

26. The machine, according to claim 25, wherein said inlet comprises, inside the hopper, an outlet mouthpiece opposite a seal mounted on a stem that is supported on the inside part of the cover and driven through the cover via driving mean that are attached to the outside thereof.

27. The machine, according to claim 1, further comprising detection means for controlling the level of material to be stuffed/dosed inside the hopper.

* * * * *